(12) United States Patent
Yamanishi et al.

(10) Patent No.: US 9,393,752 B2  
(45) Date of Patent: Jul. 19, 2016

(54) METHOD FOR PRODUCING FIRED BODY AND FIRING FURNACE USED THEREFOR

(75) Inventors: Osamu Yamanishi, Niihama (JP); Keiichiro Suzuki, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 328 days.

(21) Appl. No.: 13/881,935

(22) PCT Filed: Oct. 25, 2011

(86) PCT No.: PCT/JP2011/074556  
§ 371 (c)(1), (2), (4) Date: May 30, 2013

(87) PCT Pub. No.: WO2012/057142  
PCT Pub. Date: May 3, 2012

(65) Prior Publication Data  
US 2013/0241120 A1 Sep. 19, 2013

(30) Foreign Application Priority Data  
Oct. 29, 2010 (JP) .................. 2010-244105

(51) Int. Cl.  
*C04B 35/638* (2006.01)  
*C04B 35/64* (2006.01)  
(Continued)

(52) U.S. Cl.  
CPC .......... *B29D 99/0089* (2013.01); *C04B 35/638* (2013.01); *C04B 35/64* (2013.01); *F27B 5/14* (2013.01); *F27B 5/16* (2013.01);  
(Continued)

(58) Field of Classification Search  
CPC .............. C04B 35/638; C04B 38/0006; C04B 2235/6584  
See application file for complete search history.

(56) References Cited

U.S. PATENT DOCUMENTS

| | | | |
|---|---|---|---|
| 6,116,894 A | 9/2000 | Kolln et al. | |
| 2005/0221974 A1* | 10/2005 | Tomita | 501/141 |

(Continued)

FOREIGN PATENT DOCUMENTS

| | | |
|---|---|---|
| JP | 9-502012 A | 2/1997 |
| JP | 2008-226941 A | 9/2008 |

(Continued)

OTHER PUBLICATIONS

International Preliminary Report on Patentability and Written Opinion issued May 23, 2013 for counterpart International Application No. PCT/JP2011/074556 to Sumitomo Chemical Co., Ltd.

(Continued)

*Primary Examiner* — Erin Snelting  
(74) *Attorney, Agent, or Firm* — Sughrue Mion, PLLC

(57) ABSTRACT

The method for producing a fired body of the invention has the steps of: preparing a starting material mixture; molding the mixture to obtain a green molded body; a first heating step to make the molded body contain residual carbon-containing substances in a furnace by increasing the temperature of the furnace while introducing an oxygen containing gas; and a second heating step to obtain a fired body by further increasing the temperature of the furnace without introducing the oxygen containing gas; wherein the conditions for the first heating step are set so that when the molded body is allowed to stand after the first heating step in an oxygen-containing atmosphere at 900° C., the temperature at the center section of the molded body is at least 20° C. higher than the temperature of the atmosphere in the furnace.

2 Claims, 3 Drawing Sheets

(51) Int. Cl.
*B29D 99/00* (2010.01)
*F27D 19/00* (2006.01)
*F27B 5/14* (2006.01)
*F27B 5/16* (2006.01)

(52) U.S. Cl.
CPC ........ *F27D 19/00* (2013.01); *C04B 2235/6562* (2013.01); *C04B 2235/6565* (2013.01); *C04B 2235/6567* (2013.01); *C04B 2235/6583* (2013.01); *C04B 2235/6584* (2013.01); *F27D 2019/0015* (2013.01)

(56) References Cited

U.S. PATENT DOCUMENTS

2007/0054229 A1    3/2007  Hanzawa et al.
2011/0127699 A1*   6/2011  Vayansky et al. ............. 264/630

FOREIGN PATENT DOCUMENTS

JP    2011-73945 A      4/2011
WO    2005/047207 A1    5/2005

OTHER PUBLICATIONS

Office Action issued Apr. 2, 2015 in counterpart European Patent Application No. 11836275.5.
Office Action issued Jun. 24, 2014 in counterpart Mexican Patent Application No. MX/a/2013/004502 with English translation.
Extended European Search Report dated Mar. 18, 2014 issued in corresponding European Patent Application No. 11 83 6275.
Communication dated Jan. 29, 2016 from the European Patent Office in counterpart application No. 11836275.5.

* cited by examiner

METHOD FOR PRODUCING FIRED BODY AND FIRING FURNACE USED THEREFOR

CROSS REFERENCE TO RELATED APPLICATIONS

This application is a National Stage of International Application No. PCT/JP2011/074556 filed Oct. 25, 2011, claiming priority based on Japanese Patent Application No. 2010-244105 filed Oct. 29, 2010, the contents of all of which are incorporated herein by reference in their entirety.

TECHNICAL FIELD

The present invention relates to a technique for producing a fired body, and more specifically, it relates to a method for producing a fired body from a honeycomb-shaped green molded body, which has the same shape, and to a firing furnace to be used therefor.

BACKGROUND ART

Honeycomb filter structures for DPF (Diesel Particulate Filters) are widely known in the conventional art. Such honeycomb filter structures are produced by using a plugging material to plug one sides of some of the through-holes of a green molded body produced with an extruder, while plugging the other sides of the other through-holes with a plugging material, and firing the structure. Patent literature 1 discloses a continuous heating furnace used for production of ceramic products.

CITATION LIST

Patent Literature

[Patent literature 1] Japanese Unexamined Patent Application Publication No. 9-502012

SUMMARY OF INVENTION

Technical Problem

A honeycomb filter structure for DPF is usually used by being housed in a rigid case. If the dimensional precision of the honeycomb filter structure is low, troubles will tend to occur such as cracking in the honeycomb filter structure as a result of thermal stress. It is therefore necessary to minimize deformation produced during the course of firing the green molded body.

Having been devised in light of this situation, it is an object of the present invention to provide a method for producing a fired body with high dimensional precision that, during the course of firing a honeycomb-shaped green molded body, can adequately inhibit deformation of the molded body, as well as a firing furnace to be used therefor.

Solution to Problem

As a result of much diligent research on firing conditions for honeycomb-shaped green molded bodies, the present inventors have experimentally found that a suitable fired body can be obtained, up to relatively high-temperature conditions (for example, 900° C.) during the course of temperature increase in the firing furnace, even when organic materials are left to remain in the molded body, and the following invention has been completed.

The invention provides a method for producing a fired body from a honeycomb-shaped green molded body, having the shape thereof, the method comprising the steps of: preparing a starting material that is a mixture containing an inorganic compound, an organic binder and a solvent; molding the mixture to obtain a green molded body; a first heating step to make the molded body contain residual carbon-containing substances in a furnace by increasing the temperature of the furnace while introducing a gas with an oxygen concentration of 1 to 5 vol %; and a second heating step following the first heating step to obtain a fired body by further increasing the temperature of the furnace without introducing a gas with an oxygen concentration of 1 to 5 vol %; wherein the conditions for the first heating step are set so that when the molded body is allowed to stand after the first heating step in an oxygen-containing atmosphere at 900° C., the temperature at the center section of the molded body is at least 20° C. higher than the temperature of the atmosphere in the furnace.

The method for producing a fired body according to the invention comprises a first heating step to obtain a molded body with a prescribed amount of residual carbon-containing substance (an organic binder or a substance produced by its heating). By introducing gas with a lower oxygen concentration than the air in the furnace (an oxygen concentration of 1 to 5 vol %) in the first heating step, it is possible to prevent premature combustion of the organic binder, and to leave an amount of residual carbon-containing substance that is sufficient to maintain the shape of the molded body up to the point just prior to sintering of the inorganic compound in the second heating step. This can sufficiently inhibit deformation of the molded body during the course of obtaining a fired body from the green molded body, and will allow production of a fired body with high dimensional precision.

Preferably, when the treatment of the atmosphere in the furnace reaches 500° C. to 900° C. in the method described above, introduction of the gas with an oxygen concentration of 1 to 5 vol % into the furnace is interrupted, and oxygen concentration control in the furnace is terminated. The temperature of the atmosphere in the furnace upon completion of the first heating step may be set within a range of 500° C. to 900° C. In the second heating step, it is sufficient if oxygen for combustion of the carbon-containing substance remaining in the molded body is present, and there is no need for special control of the oxygen concentration in the furnace.

The invention also provides a firing furnace comprising a furnace body for a molded body, first heating means for heating the atmosphere in the furnace body, second heating means for heating gas that includes a carbon-containing substance to cause combustion of the substance, a first tubing connecting the gas outlet of the furnace body with the second heating means, a second tubing connecting the second heating means with the gas inlet of the furnace body, and means for controlling the flow rate of the gas supplied to the second heating means through the first tubing, based on the amount of carbon-containing substance in the gas inside the furnace body.

The firing furnace can circulate the gas in the furnace body through the first tubing and second tubing. Second heating means is installed along the circulation path formed by the first and second tubings. By providing such a circulation path, the carbon-containing substance in the gas discharged from the furnace body is combusted by the second heating means. This allows the oxygen in the gas to be consumed and the oxygen concentration to fall to the range of 1 to 5 vol %, and allows the gas to be returned through the second tubing into the furnace body.

With this combustion furnace, by returning gas with a lower oxygen concentration than the air obtained by the second heating means (an oxygen concentration of 1 to 5 vol %) through the second tubing into the furnace body, it is possible to prevent premature combustion of the organic binder, and to leave an amount of residual carbon-containing substance that is sufficient to maintain the shape of the molded body up to the point just prior to sintering of the inorganic compound. This can sufficiently inhibit deformation of the molded body during the course of firing the green molded body, and will allow production of a fired body with high dimensional precision. For example, by adjusting the flow rate of the gas supplied through the first tubing to the second heating means, it is possible to adjust the oxygen concentration of the gas returned through the second tubing to the furnace body.

The combustion furnace preferably further comprises means for measuring the amount of carbon-containing substance in the gas inside the furnace body. By applying such means, it is possible to assess with sufficient accuracy the flow rate of gas to be supplied to the second heating means, even when the composition of the starting material forming the green molded body has been changed.

Advantageous Effects of Invention

According to the invention it is possible to sufficiently inhibit deformation of a honeycomb-shaped green molded body during the course of firing the molded body, and to produce a fired body with high dimensional precision.

DESCRIPTION OF EMBODIMENTS

Preferred embodiments of the invention will now be explained in detail, with reference to the accompanying drawings.

<Green Molded Body>

Figure 1:
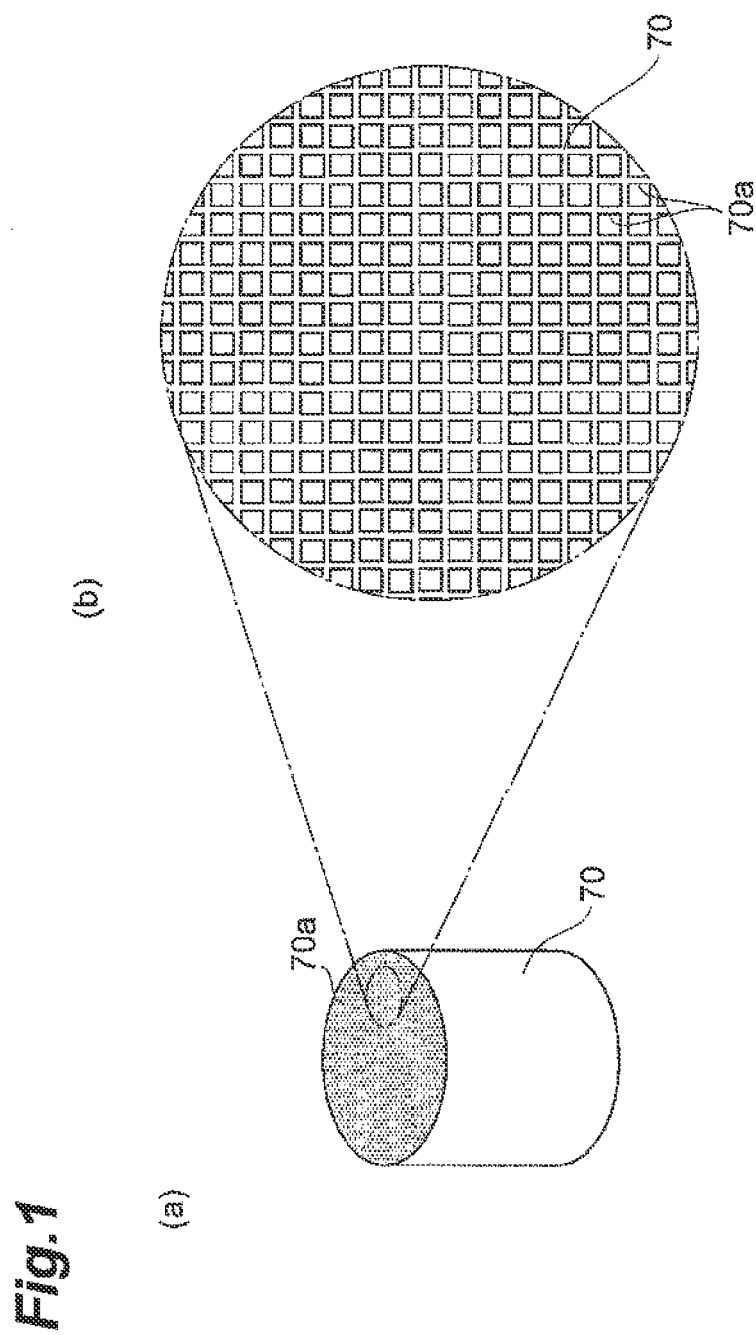
FIG. 1(a) is a perspective view showing one example of a green molded body for a honeycomb structure.
FIG. 1(b) is a partial magnified view of the green molded body.

The green molded body 70 shown in FIG. 1 is obtained by extrusion molding a starting composition. As shown in FIG. 1(a), the green molded body 70 is a circular column having a plurality of through-holes 70a arranged in a substantially parallel manner. The cross-sectional shapes of the through-holes 70a are square, as shown in FIG. 1(b). As viewed from an end face, the plurality of through-holes 70a have a square arrangement for the green molded body 70, i.e. the central axes of the through-holes 70a are disposed so that they are positioned at the apexes of squares. The square shapes of the cross-sections of the through-holes 70a may have sizes with sides of 0.8 to 2.5 mm, for example. A honeycomb structure is produced by firing the green molded body 70 at a prescribed temperature after appropriately plugging one side of the through-holes 70a.

There are no particular restrictions on the length of the through-holes 70a of the green molded body 70 in the direction of their extension, and it may be 40 to 350 mm, for example. There are also no particular restrictions on the outer diameter of the green molded body 70, and it may be 100 to 320 mm, for example.

There are no particular restrictions on the starting composition forming the green molded body 70, but for production of a honeycomb structure for a DPF, it includes an inorganic compound source powder as the ceramic starting material, an organic binder such as methyl cellulose, and additives that are added as necessary. From the viewpoint of high-temperature resistance of the honeycomb structure, preferred ceramic materials include oxides such as alumina, silica, mullite, cordierite, glass and aluminum titanate, or silicon carbide, silicon nitride and the like. Aluminum titanate may further include magnesium and/or silicon.

For production of an aluminum titanate green molded body, for example, the inorganic compound source powder may include an aluminum source powder such as α-alumina powder, and a titanium source powder such as anatase or rutile titania powder, and if necessary also a magnesium source powder such as magnesia powder or magnesia spinel powder, and/or a silicon source powder such as silicon oxide powder or glass frit.

Organic binders include celluloses such as methyl cellulose, carboxylmethyl cellulose, hydroxyalkylmethyl cellulose and sodium carboxylmethyl cellulose; alcohols such as polyvinyl alcohol; and ligninsulfonic acid salts.

Examples of additives include pore-forming agents, lubricants, plasticizers, dispersing agents and solvents.

Pore-forming agents include carbon materials such as graphite; resins such as polyethylene, polypropylene and polymethyl methacrylate; plant materials such as starch, nut shells, walnut shells and corn; ice; and dry ice.

Lubricants and plasticizers include alcohols such as glycerin; higher fatty acids such as caprylic acid, lauric acid, palmitic acid, arachidic acid, oleic acid and stearic acid; stearic acid metal salts such as Al stearate; and polyoxyalkylenealkyl ethers.

Examples of dispersing agents include inorganic acids such as nitric acid, hydrochloric acid and sulfuric acid; organic acids such as oxalic acid, citric acid, acetic acid, malic acid and lactic acid; alcohols such as methanol, ethanol and propanol; and surfactants such as ammonium polycarboxylate.

Examples of solvents to be used include alcohols such as methanol, ethanol, butanol and propanol; glycols such as propylene glycol, polypropylene glycol and ethylene glycol; and water.

The total content of organic components in the green molded body 70 is preferably 10 to 25 parts by weight and more preferably 15 to 20 parts by weight, with respect to 100 parts by weight of the green molded body 70. If the amount of the organic component is less than 10 parts by weight, the moldability of the green molded body 70 will be insufficient or the post-firing porosity will tend to be reduced. If the amount of the organic component exceeds 25 parts by weight, on the other hand, cracks will tend to be generated in the fired body.

<Firing Furnace>

Figure 2:
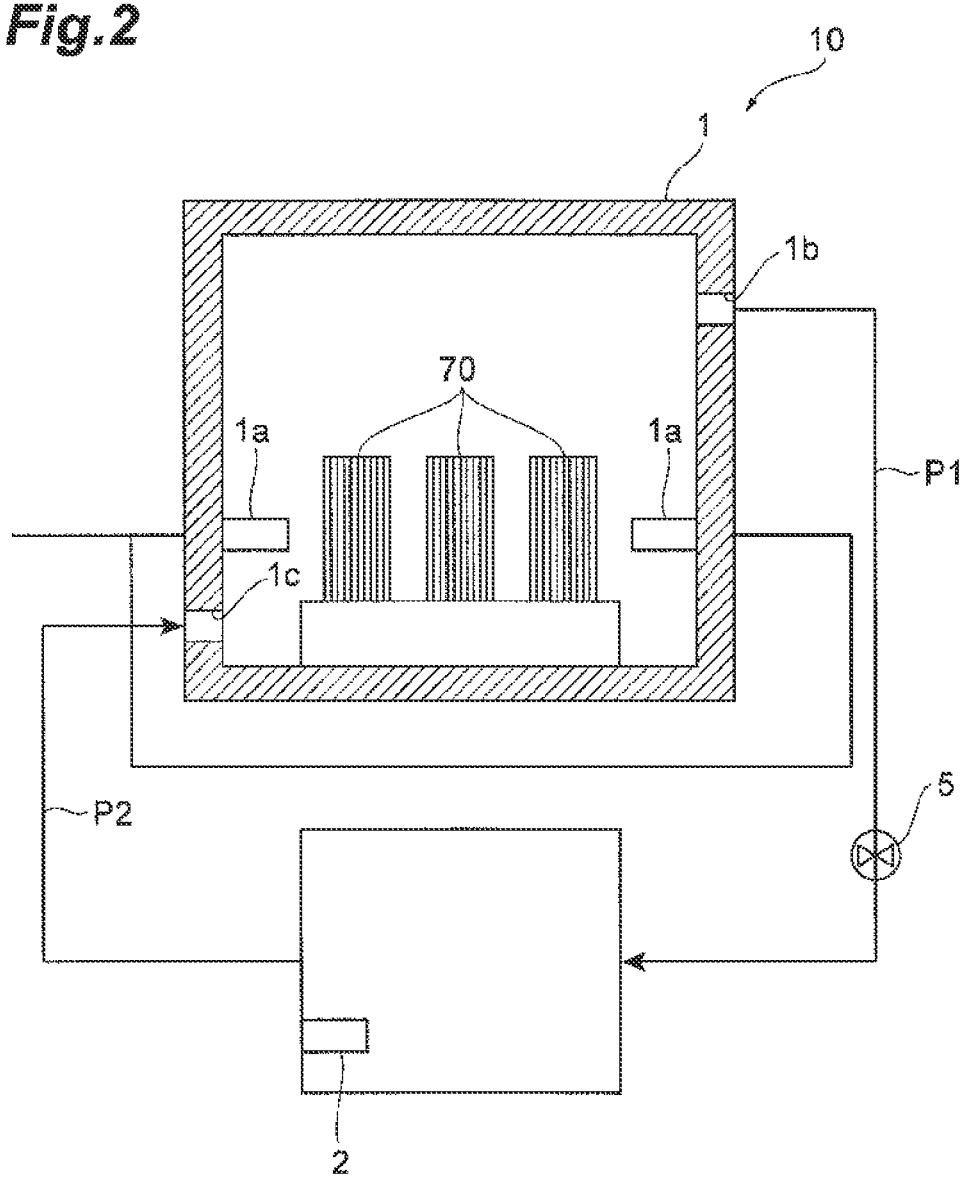
FIG. 2 is a block diagram showing a preferred embodiment of a firing furnace according to the invention.

Embodiments of the firing furnace of the invention will now be explained with reference to FIG. 2. The firing furnace 10 shown in FIG. 2 comprises a furnace body 1 that holds the green molded body 70, a burner (first heating means) 1a in the furnace body 1, an afterburner (second heating means) 2 that burns the carbon-containing substances in the gas that is discharged from the furnace body 1, first tubing P1 connecting the gas outlet 1b of the furnace body 1 and the afterburner 2, second tubing P2 connecting the afterburner 2 with the gas inlet 1c of the furnace body 1, and a flow-regulating valve 5 installed along the first tubing P1.

The furnace body 1 is preferably one that can increase the temperature of the atmosphere in the furnace to 1500° C. or higher. The burner 1a that uses LPG or the like as fuel is installed in the furnace body 1, so as to be able to increase the furnace temperature by heat of combustion. Although it will depend on the temperature condition and the structure of the furnace body 1, the oxygen concentration of the gas discharged from the first tubing P1 preferably falls to about 4 to 15 vol % by consumption of oxygen in the furnace by combustion of the fuel. The example used here was a gas furnace with a burner 1a installed in the furnace body 1, but an electric furnace may be used instead of a gas furnace.

The afterburner 2 is provided along the circulation path that comprises the first and second tubings P1, P2. By supplying the gas in the furnace body 1 through the first tubing P1 to the afterburner 2, it is possible to burn the carbon-containing substances in the gas. The carbon-containing substances in the gas are derived from the organic binder or additives in the starting material for the green molded body. The oxygen of the gas in the circulation path is consumed by combustion of the fuel of the afterburner 2 and the carbon-containing substances. By adjusting the gas flow rate in the first tubing P1 and the combustion conditions of the afterburner 2, the oxygen concentration of the gas returned to the furnace body 1 through the second tubing P2 can be adjusted to 1 to 5 vol %.

The flow-regulating valve 5 is installed along the first tubing P1, allowing aperture adjustment in response to the concentration of carbon-containing substance in the gas in the furnace body 1 or flowing in the first tubing P1. A hydrocarbon meter or CO meter may be used as the means for measuring the amount of carbon-containing substances in the gas. The aperture of the flow-regulating valve 5 may be adjusted manually based on these measured values, or the aperture of the flow-regulating valve 5 may be adjusted by an automatic control system. As an automatic control system there may be used one that comprises, for example, a computer that calculates the flow rate of gas to be supplied to the afterburner 2, means that sends the concentration measurement value for the carbon-containing substance in the furnace body 1 or gas flowing in the first tubing P1 to the computer, and means that adjusts the aperture of the flow-regulating valve 5 based on the signal outputted from the computer.

<Method for Producing Fired Body>

A method for producing a fired body, comprising a step of firing a green molded body 70 using a firing furnace 10 to obtain a honeycomb filter structure (fired body), will now be explained. The method of this embodiment comprises a starting material preparation step, a molding step, a first heating step and a second heating step.

The starting material preparation step is a step of preparing a starting composition comprising an inorganic compound source powder (inorganic compound), an organic binder and a solvent. The molding step is a step of molding the starting composition to obtain a green molded body 70.

The first heating step is a step of increasing the temperature in the furnace body 1 while introducing a gas with an oxygen concentration of 1 to 5 vol % (preferably 1.5 to 3.0 vol %) into the furnace body 1 in which the green molded body 70 is held, to obtain a molded body comprising residual carbon-containing substances. In the first heating step, the atmosphere in the furnace is preferably increased in temperature to 500° C. to 900° C. at a temperature-elevating rate of 1° C. to 30° C./hr.

The treatment conditions for the first heating step are set so that when the molded body has been allowed to stand after the first heating step in an atmosphere of 900° C. in which oxygen is present, the temperature at the center section of the molded body is at least 20° C. higher than the temperature of the atmosphere in the furnace. The temperature difference is more preferably 20° C. to 50° C. If the temperature difference is less than 20° C., this means that the amount of carbon-containing substances remaining in the molded body is low, and that the shape of the molded body cannot be adequately retained during the firing process, while if it is more than 50° C., inconveniences will tend to result, such as cracking of the molded body by heat release during the firing process. The temperature of the atmosphere in the furnace body 1 and the temperature at the center section of the molded body during firing may be measured using a thermocouple, for example.

The treatment conditions in the first heating step (for example, the oxygen concentration, the temperature-elevating rate and the temperature during transfer to the second heating step) may be determined by preparing, as a sample, a green molded body having the same composition and shape as the green molded body 70, and conducting a temperature elevating test in which the temperature of the sample is increased to 900° C. under prescribed conditions, and it is then held at 900° C. to burn the carbon-containing substances remaining in the sample. If the difference between the temperature $T_1$ at the center section of the sample and the temperature $T_2$ of the atmosphere in the furnace (=900° C.), or $\Delta T$ (=$T_1-T_2$), is less than 20° C. in the stage of holding the temperature at 900° C., the temperature elevating test may be repeated with a lower oxygen concentration or a higher temperature-elevating rate. If $\Delta T$ exceeds 50° C., on the other hand, the temperature elevating test may be repeated with a higher oxygen concentration or a lower temperature-elevating rate.

Once the treatment conditions for the first heating step have been determined by one or several temperature elevating tests, it is not necessary to carry out a temperature elevating test for each firing of the green molded body 70 in a batch process. When the composition of the green molded body 70 has been changed, for example, the temperature elevating test may be repeated to adjust the treatment conditions for the first heating step.

The temperature during transfer to the second heating step may be determined based on the sinterability of the inorganic compound in the green molded body 70. When an easily sinterable inorganic compound has been used, for example, transfer to the second heating step may be at a relatively low temperature (500° C. or higher and less than 700° C.). When a poorly sinterable inorganic compound has been used, on the other hand, transfer to the second heating step may be at a relatively high temperature (between 700° C. and 900° C.). If the temperature during transfer is lower than 900° C., it is preferably increased from the temperature during transfer to 900° C. as rapidly as possible in the temperature elevating test, at a temperature-elevating rate of 80° C. to 100° C./hr.

The second heating step is a step in which, after the first heating step, the temperature in the furnace body 1 is further increased without introducing gas with an oxygen concentration of 1 to 5 vol % into the furnace body 1, to obtain a fired body. The flow-regulating valve 5 may be closed to terminate introduction of the gas. In the second heating step, it is sufficient if oxygen for combustion of the carbon-containing substance remaining in the molded body is present, and there is no need for special control of the oxygen concentration in the furnace body 1. In the second heating step, the atmosphere in the furnace is preferably increased in temperature to 1300° C. to 1650° C. at a temperature-elevating rate of 50° C. to 100° C./hr, and held at that temperature for between 10 minutes and 24 hours.

Following the second heating step, the furnace temperature is lowered at a rate of 1° C. to 500° C./hr, and upon reaching approximately room temperature, the fired body in the furnace body 1 is recovered.

By introducing gas with a lower oxygen concentration than the air in the furnace body 1 (an oxygen concentration of 1 to 5 vol %), according to the method of this embodiment, it is possible to prevent premature combustion of the organic binder, and to leave an amount of residual carbon-containing substance that is sufficient to maintain the shape of the molded body up to the point just prior to sintering of the inorganic compound in the second heating step. This can sufficiently inhibit deformation of the molded body during the course of obtaining a fired body from the green molded body 70, and will allow production of a fired body with high dimensional precision.

The above detailed explanation of a preferred embodiment of the invention is not intended to restrict the scope of the invention to this embodiment. For example, this embodiment was described for a circular column green molded body 70, but the shape and structure of the molded body is not limited thereto. The outer shape of the green molded body 70 may be rectangular columnar, such as square columnar, or elliptic cylindrical, for example. Also, the arrangement of the through-holes 70a does not need to be a square arrangement, and may instead be a substantially triangular arrangement or substantially hexagonal arrangement, for example. In addition, the shapes of the through-holes 70a do not need to be square, and may instead be substantially triangular, substantially hexagonal, substantially octagonal or substantially circular.

<Measurement of Internal Temperature of Molded Body>

A green molded body having the shape illustrated in FIG. 1 was prepared, and a test was conducted to confirm the amount of carbon-containing substances remaining in the molded body after the first heating step. The starting composition of the green molded body prepared for the test is shown in Table 1. In the table, POAAE stands for polyoxyalkylene-alkyl ether, and UNILUBE (registered trademark of NOF Corp.) was used.

TABLE 1

| Material | | Mixing ratio (pts. by weight) |
|---|---|---|
| Ceramic powder | $Al_2O_3$—$TiO_2$—MgO—$SiO_2$ | 88.0 |
| Organic binder | Hydroxypropyl cellulose | 7.8 |
| Pore-forming agent | Starch | 12.0 |
| Lubricant | Glycerin + POAAE | 5.04 |
| Solvent | Water | 28.30 |

The temperature-elevating rate was 10° C./hr from room temperature to 600° C. for the temperature of the atmosphere in the furnace, and gas with an oxygen concentration of 2% was introduced into the furnace through the second tubing. After the temperature of the atmosphere in the furnace reached 600° C., the temperature-elevating rate was 80° C./hr, and the oxygen concentration in the furnace was not controlled, with no introduction of gas with an oxygen concentration of 2%. After keeping the temperature of the atmosphere in the furnace at 900° C. for approximately 5 hours in this test, the furnace interior was cooled, without sintering of the molded body.

Figure 3:
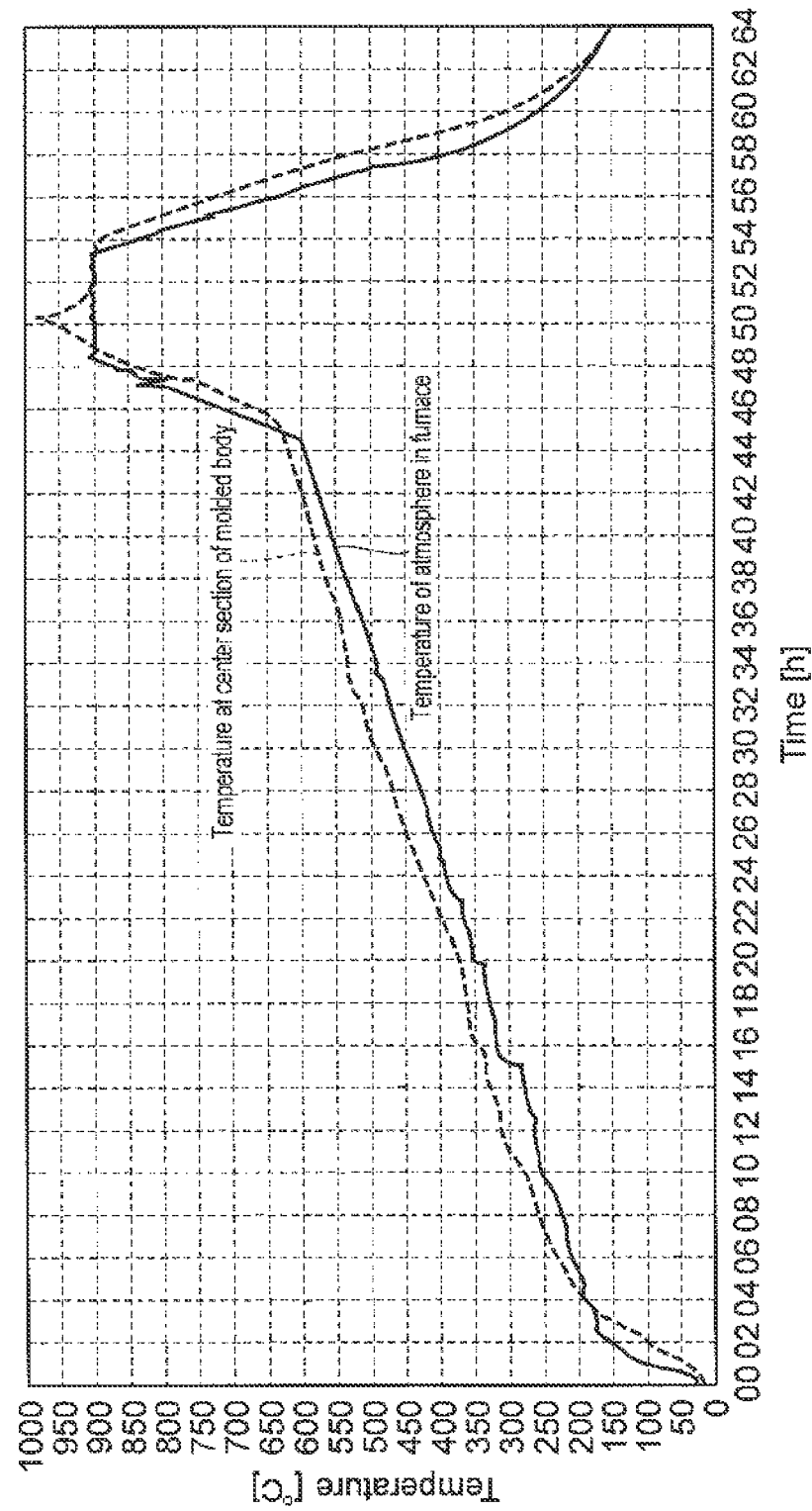
FIG. 3 is a graph showing temperature change at the center section of a molded body, with increase of the temperature of the atmosphere in the furnace to 900° C., followed by holding at 900° C. for a fixed time period, and then subsequent cooling.

FIG. 3 is a graph showing temperature change of the atmosphere in the furnace and temperature change at the center section of the molded body. The maximum temperature at the center section of the molded body was 975° C. at the stage when the temperature of the atmosphere in the furnace was kept at 900° C., and the maximum temperature difference was 75° C.

INDUSTRIAL APPLICABILITY

According to the invention it is possible to sufficiently inhibit deformation of a honeycomb-shaped green molded body during the course of firing the molded body, and to produce a fired body with high dimensional precision.

REFERENCE SIGNS LIST

1: Furnace body, 1a: burner (first heating means), 1b: gas outlet, 1c: gas inlet, 2: afterburner (second heating means), 5: flow-regulating valve, 10: firing furnace, 70: green molded body, P1: first tubing, P2: second tubing.

The invention claimed is:

1. A method for producing a honeycomb-shaped fired body, the method comprising the steps of:
   preparing a starting material that is a mixture containing an inorganic compound, an organic binder and a solvent;
   molding the mixture to obtain a honeycomb-shaped green molded body;
   a first heating step to make the molded body contain residual carbon-containing substances in a furnace by increasing the temperature of the furnace while introducing a gas with an oxygen concentration of 1 to 5 vol %; and
   a second heating step following the first heating step to obtain the fired body by further increasing the temperature of the furnace without introducing a gas with an oxygen concentration of 1 to 5 vol %;
   wherein conditions for the first heating step are set so that when the molded body is allowed to stand after the first heating step in an oxygen-containing atmosphere at 900° C., the temperature at a center section of the molded body is at least 20° C. higher than the temperature of the atmosphere in the furnace, and in the first heating step, the temperature-elevating rate is 10-30° C./hr, and in the second heating step, the temperature-elevating rate is 50-100° C./hr.

2. The method according to claim 1, wherein an oxygen concentration control in the furnace is terminated by interrupting the introduction of the gas with an oxygen concentration of 1 to 5 vol % into the furnace when the atmosphere in the furnace reaches 500° C. to 900° C.

* * * * *